US012754343B2

(12) United States Patent
Sun et al.

(10) Patent No.: US 12,754,343 B2
(45) Date of Patent: Oct. 6, 2026

(54) ESTIMATING EM LWD MEASUREMENT UNCERTAINTY USING MACHINE LEARNING

(71) Applicant: Schlumberger Technology Corporation, Sugar Land, TX (US)

(72) Inventors: Keli Sun, Rosenberg, TX (US); Hui Xie, Sugar Land, TX (US); Xiaoyan Zhong, Sugar Land, TX (US); Kong Hauw Sarwa Bakti Tan, Sugar Land, TX (US); Ettore Mirto, Petaling Jaya (MY); Kent David Harms, Richmond, TX (US); Xiao Bo Hong, Sugar Land, TX (US); Pontus Loviken, Chatillon (FR); Gordana Draskovic, Bourg-la-Reine (FR); Thanh Nhan Nguyen, Orsay (FR); Josselin Kherroubi, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 92 days.

(21) Appl. No.: 18/905,669

(22) Filed: Oct. 3, 2024

(65) Prior Publication Data

US 2025/0110253 A1 Apr. 3, 2025

Related U.S. Application Data

(60) Provisional application No. 63/587,478, filed on Oct. 3, 2023.

(51) Int. Cl.
*G01V 3/38* (2006.01)
*G01V 1/50* (2006.01)
(Continued)

(52) U.S. Cl.
CPC .................. *G01V 3/38* (2013.01); *G01V 3/30* (2013.01); *G01V 1/50* (2013.01); *G01V 3/12* (2013.01);
(Continued)

(58) Field of Classification Search
CPC ... G01V 3/38; G01V 3/30; G01V 3/12; G01V 3/18; G01V 1/50; G06N 3/02; G06N 20/00; G06N 3/08
See application file for complete search history.

(56) References Cited

U.S. PATENT DOCUMENTS 8,305,082 B2 11/2012 Merchant
8,664,958 B2 3/2014 Simon
(Continued)

OTHER PUBLICATIONS

Al Ibrahim et al. ("Increasing signal-to-noise ratio of borehole image logs using convolutional neural networks." Paper presented at the SEG/AAPG International Meeting for Applied Geoscience & Energy, Houston, Texas, USA, Aug. 2022. doi: https://doi.org/10.1190/image2022-3751228.1) (Year: 2022).*
(Continued)

*Primary Examiner* — Christian T Bryant
(74) *Attorney, Agent, or Firm* — Jeffrey D. Frantz

(57) ABSTRACT

A method for estimating EM measurement uncertainty includes evaluating EM logging measurements with a trained machine learning model to estimate the measurement uncertainties of the EM logging measurements. The trained machine learning model is trained using a training data set made up of modeled EM logging measurements and corresponding measurement uncertainties.

9 Claims, 5 Drawing Sheets

(51) Int. Cl.

| | |
|---|---|
| ***G01V 3/12*** | (2006.01) |
| ***G01V 3/18*** | (2006.01) |
| ***G01V 3/30*** | (2006.01) |
| ***G06N 3/02*** | (2006.01) |
| ***G06N 3/08*** | (2023.01) |
| ***G06N 20/00*** | (2019.01) |

(52) U.S. Cl.

CPC .................. *G01V 3/18* (2013.01); *G06N 3/02* (2013.01); *G06N 3/08* (2013.01); *G06N 20/00* (2019.01)

(56) References Cited

U.S. PATENT DOCUMENTS

| | | | |
|---|---|---|---|
| 8,841,913 | B2 | 9/2014 | Yang |
| 9,599,741 | B2 | 3/2017 | Simon |
| 2017/0052273 | A1 | 2/2017 | Yang |
| 2019/0056355 | A1 | 2/2019 | Amineh et al. |
| 2019/0113651 | A1 | 4/2019 | Donderici |
| 2019/0383961 | A1 | 12/2019 | Dong |
| 2021/0355806 | A1* | 11/2021 | Fan ......................... E21B 44/02 |
| 2023/0213681 | A1 | 7/2023 | Fouda |

OTHER PUBLICATIONS

Simoes et al. ("Deep Learning for Multiwell Automatic Log Correction." Petrophysics 63 (2022): 724â747. doi: https://doi.org/10.30632/PJV63N6-2022a10) (Year: 2022).*

* cited by examiner

ESTIMATING EM LWD MEASUREMENT UNCERTAINTY USING MACHINE LEARNING

CROSS REFERENCE TO RELATED APPLICATIONS

This application claims priority to U.S. Provisional Patent Application No. 63/587,478, which was filed on Oct. 3, 2023 and is incorporated herein by reference in its entirety.

BACKGROUND

The use of electromagnetic (EM) measurements is well known in the oilfield industry. Both logging while drilling (LWD) and wireline (WL) logging techniques are commonly utilized to determine electromagnetic properties of a subterranean formation, which, along with porosity measurements, may indicate the presence of hydrocarbons in the formation. Moreover, EM LWD measurements are commonly employed in geosteering operations to provide information from which drill bit steering decisions may be made.

When evaluating such EM measurements, the reliability (or uncertainty) of the data is often considered. Such reliability (or uncertainty) may be quantified by the level of systematic error and the standard deviation. Quantitative uncertainties are desired for the purpose of data usage automation. Measurement uncertainties are sometimes obtained by making measurements where the true values are known and comparing the measurements with the true values. However, this approach is not practical in most scenarios, particularly in EM LWD operations where the true values are unknown.

The use of customized noise models may also be used to estimate measurement uncertainties. One limitation with the use of a noise model is that it generally requires an assumed formation model which is generally not available or known with certainty in field operations. Moreover, for LWD operations, the EM data sent to the surface is severely limited by telemetry bandwidth. Owing to this limitation, only the final processed data channels are available at the surface. Without access to the intermediate signals (e.g., the raw EM voltage measurements, etc.) applying a noise model is difficult.

There is a need in the industry for improved methods for estimating EM measurement uncertainty, particularly in LWD operations.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Methods and systems for estimating measurement uncertainty of electromagnetic (EM) logging measurements are disclosed. In one example embodiment, a method comprises deploying an EM logging tool in a wellbore; using the EM logging tool to make EM logging measurements in the wellbore; and evaluating the EM logging measurements with a trained machine learning model to estimate the measurement uncertainties of the EM logging measurements, wherein the trained machine learning model is trained using a training data set made up of modeled EM logging measurements and corresponding measurement uncertainties.

Figure 1:
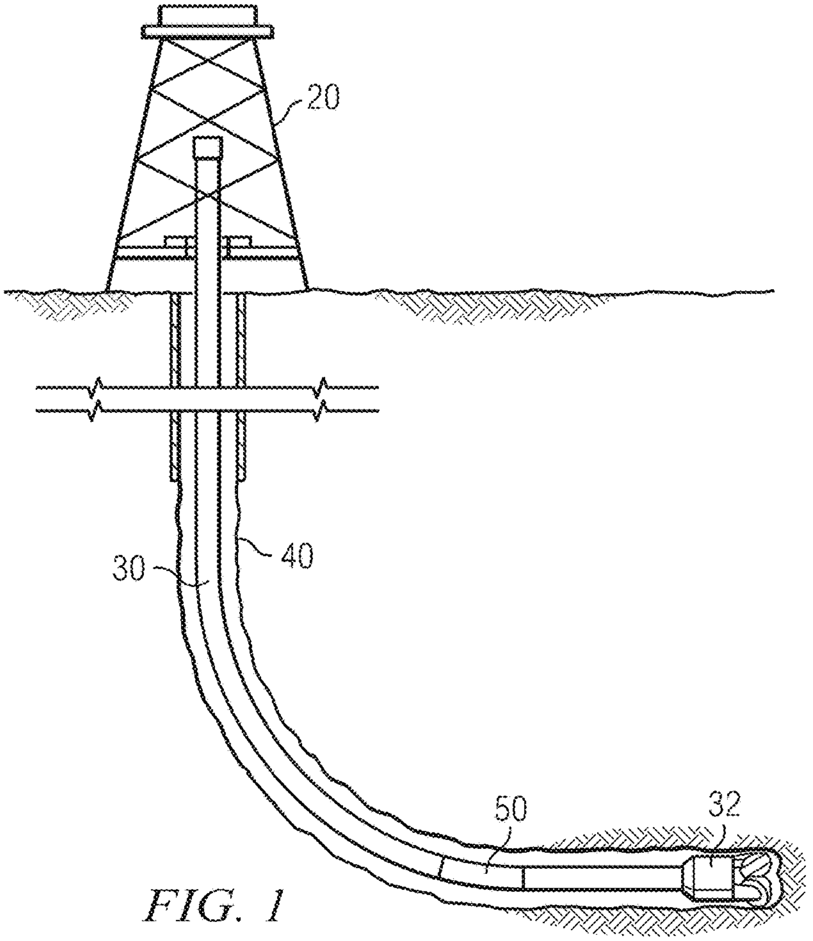
FIG. 1 depicts an example drilling rig including a disclosed electromagnetic LWD tool.

FIG. 1 depicts a drilling rig 20 including a drill string 30 and an example EM LWD tool 50 deployed in the string 30 and disposed within a wellbore 40. The drilling rig 20 may be deployed onshore or offshore (an onshore application is depicted). As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards. In both onshore and offshore operations, the wellbore 40 may be drilled in the subterranean formations via rotary drilling, slide drilling, or power drilling in a manner that is well-known to those of ordinary skill in the art (e.g., via well-known directional drilling techniques).

In the illustrated embodiment, the EM tool 50 is commonly deployed in a bottom hole assembly (BHA) including other downhole tools. The BHA may further include, for example, a rotary steerable system (RSS), a mud motor, a drill bit 32, a measurement while drilling (MWD) tool, and/or one or more other LWD tools. The other LWD tools may be configured to measure other properties of the formation through which the wellbore penetrates, for example, including NMR relaxation times, density, porosity, sonic velocity, gamma ray counts, and the like. A suitable MWD tool may be configured to measure one or more properties of the wellbore 40 as it is drilled or at any time thereafter. The physical properties may include, for example, pressure, temperature, wellbore caliper, wellbore trajectory (attitude), a toolface angle, and the like.

It will, of course, be understood that the disclosed embodiments are not limited to any particular BHA configuration. Nor are they limited to any particular type of drilling operation. Moreover, while geosteering applications are limited to LWD applications, the disclosed methods are not necessarily limited to geosteering or logging while drilling applications (as depicted on FIG. 1), but may also be implemented in WL logging applications.

Figure 2:
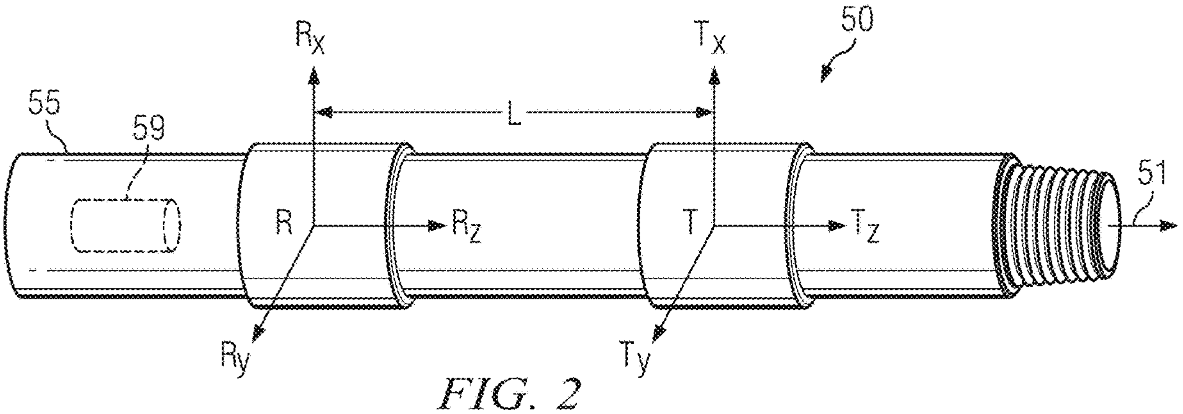
FIG. 2 depicts one example embodiment of the LWD tool shown on FIG. 1.

FIG. 2 depicts one example embodiment of EM LWD tool 50. In the depicted embodiment, the tool 50 includes at least one transmitter T and at least one receiver R axially spaced apart from one another on a tool collar 55. The tool collar 55 and any optional internal mandrel or external stabilizer blades may be referred to collectively herein as a tool body. Common electromagnetic logging tools include multiple spaced apart transmitters and receivers having various configurations. Examples of suitable electromagnetic logging tools include, but are not limited to, PeriScope™, ARC™, IMPulse™, EcoScope™, CDR™, MCR™, GeoSphere™, and IriSphere™ which are available from SLB®.

The transmitter T and receiver R may include substantially any EM transmitter and receiver components suitable for use in a downhole tool (e.g., in an LWD tool). While not limited in this regard, it may be advantageous in certain embodiments to employ transmitter and receiver configurations that enable directional measurements such as voltage tensor measurements (or partial voltage tensor measurements) to be made. In the depicted example, the transmitter T and receiver R may each include a triaxial antenna arrangement (e.g., three mutually orthogonal antennas including an axial antenna and first and second transverse antennas that are orthogonal to one another in this particular embodiment). For example, the transmitter and receiver may each include three collocated antennas having mutually orthogonal moments $T_x$, $T_y$, $T_z$ and $R_x$, $R_y$, $R_z$ that are aligned with corresponding x-, y-, and z-directions (axes) in the wellbore or tool reference frames. By collocated it is meant that the axial spacing of the antenna moments is generally less than the diameter of the tool collar on which they are deployed. In another triaxial arrangement, the transmitter and/or receiver may include three rotationally offset, collocated or non-collocated tilted antennas (e.g., rotationally offset by 120 degrees from one another). While the disclosed embodiment depicts a configuration in which the z-direction is aligned with the tool axis 51, it will be understood that the disclosed embodiments are not limited to any particular coordinate system or any particular orientation of the coordinate system (e.g., any particular orientation of the x-, y-, and z-axes on the tool).

The disclosed embodiments are, of course, not limited to any particular transmitter and receiver configurations on the tool collar. The transmitter(s) may be deployed above (up hole from), below (down hole from), and/or interspersed with the receiver(s). Nor are the disclosed embodiments limited to any particular antenna arrangements within the transmitters and receivers or to the use of collocated transmitting and/or receiving antennas as depicted. The transmitter T and receiver R may include substantially any suitable antenna configurations, for example, including axial, transverse, and/or tilted antenna arrangements. As is known to those of ordinary skill in the art, an axial antenna is one having a moment (e.g., $T_z$ and $R_z$ in FIG. 2) that is substantially parallel with the tool axis 51. Axial antennas are commonly wound about the circumference of the collar 55 such that the plane of the antenna is substantially orthogonal to the tool axis 51. Transverse antennas are antennas having moments (e.g., $T_x$, $T_y$ and $R_x$, $R_y$ in FIG. 2) that are perpendicular with the tool axis. A transverse antenna may include a conventional transverse antenna arrangement, for example, including a saddle coil. A tilted antenna is one whose magnetic moment is neither parallel nor perpendicular with the axis of the tool (and may be tilted, for example, at an angle of about a 45-degrees with respect to the tool axis). Axial, transverse, and tilted antennas are well-known and in commercial use in the industry.

It will be appreciated that the disclosed embodiments may also be well suited for use with deep EM LWD measurements. Thus, while not depicted in FIG. 2, it will be understood that for a deep reading EM tool the transmitter T and receiver R may be deployed on corresponding first and second distinct subs (or distinct tool collars) that may be separated by a substantial distance along the length of the BHA and that other BHA tools, e.g., including other logging tools, may be deployed between the subs. By deep or deep reading it may be meant that the spacing distance between the transmitter T and receiver R is greater than 5 meters (e.g., greater than 10 m, greater than 20 m, greater than 30 m, greater than 50 m, or even greater than 100 m). Despite the optional separation of the transmitter and receiver on distinct subs and the deployment of other downhole tools and sensors therebetween, for convenience the combined transmitter/receiver assembly is referred to herein as an EM logging tool having a tool body (or logging while drilling tool body).

With continued reference to FIG. 2, EM tool 50 may include a controller 59 (including one or more processors) configured to make EM measurements, for example, via firing the transmitting antennas and receiving corresponding voltages at the receiving antennas. The controller may be further configured to process the received voltages and construct various electromagnetic measurements (e.g., including the raw voltages, voltage coefficients, other quantities computed from the voltage coefficients, attenuation, phase shift, and the like). The controller may optionally further be in communication with a downhole telemetry tool (e.g., an MWD tool) for transmitting selected measurements to the surface. To perform these functions, the controller may include one or more processors (e.g., microprocessors) which may be in communication with one or more data storage devices (e.g., electronic or solid state memory). It will, of course, be understood that the disclosed embodiments are not limited to the use of or the configuration of any particular computer hardware and/or software.

In certain advantageous embodiments, the controller 59 may be configured to evaluate the EM measurements with a trained machine learning model to estimate a measurement uncertainty or standard deviation as described in more detail below. In such embodiments, the trained ML model may be stored in downhole memory and accessed via one or more processors in the controller to estimate the measurement uncertainty.

It will be appreciated that EM logging measurements may be made by electromagnetically coupling an EM transmitting antenna with one or more receiving antennas. Coupling an EM transmitting antenna and one or more receiving antennas may be accomplished by applying a time varying electrical current (an alternating current) to the transmitting antenna to transmit EM energy into the surrounding environment (including the formation). This is referred to as "firing" the transmitter. The transmitted energy generates a corresponding time varying magnetic field in the local environment (e.g., in the tool collar, borehole fluid, and formation). The magnetic field in turn induces electrical currents (eddy currents) in the conductive formation. These eddy currents further produce secondary magnetic fields which may produce a voltage response in a receiving antenna (the EM energy is received, for example, via measuring the complex-valued voltage in the receiving antenna). Therefore, in example embodiments, acquiring or making electromagnetic measurements may be understood to mean firing a transmitting antenna and receiving corresponding voltages at one or more receiving antennas (e.g., while drilling).

The disclosed embodiments may make use of substantially any suitable downhole EM measurements, for example including EM induction measurements and/or EM propagation measurements. As is known to those of ordinary skill in the art, commercial induction measurements are commonly made at a frequency in a range from about 10 kHz to about 100 kHz. In-phase and quadrature (out-of-phase) voltage signals may be measured at each receiver. These voltage signals may be related to an apparent resistivity, for example, by dividing the voltage by a tool constant. Commercial propagation measurements are commonly made at higher frequencies, for example, in a range from about 100 kHz to about 2 MHz. A propagation measurement generally includes a logarithm of a ratio of at least first and second voltage measurements, for example, as follows: $AT+iPS=\ln(V_1/V_2)$ where $V_1$ and $V_2$ represent first and second voltage measurements obtained from first and second distinct transmitter receiver couplings (e.g., made at first and second receiving antennas), and AT and PS represent the attenuation and phase shift of the voltage measurement. Deep EM logging measurements are commonly made at lower frequencies (e.g., in a range from 1 kHz to 100 kHz) and may also have a sufficiently large propagation constant (owing to the large spacing distance between the transmitters and receivers) such that the phase shift and attenuation can also be accurately measured.

Those of ordinary skill in the art will readily appreciate that such measurements are commonly made while rotating and translating an EM logging tool in a wellbore to obtain a plurality of measurements made at a plurality of corresponding measured depths (e.g., while drilling). The measurements may be plotted versus measured depth to generate a log or versus measured depth and toolface angle to generate an image.

During a logging operation the antenna voltages may be measured as the tool rotates (e.g., during drilling). The measured voltages may be fit to a function of the rotation angle θ (also referred to as the toolface angle or the azimuth angle), for example, to obtain average (DC), first-harmonic cosine (FHC), first harmonic sine (FHS), second harmonic cosine (SHC), and second harmonic sine (SHS) voltage coefficients as follows:

$$V_{ij} = V_{DC} + V_{FHC}\cos(\theta) + V_{FHS}\sin(\theta) + V_{SHC}\cos(2\theta) + V_{SHS}\sin(2\theta)$$

Where $V_{ij}$ represents the measured voltages and the coefficients i and j represent the transmitting and receiving antennas. It will be appreciated that $V_{ij}$ may include, for example, a 3×3 voltage tensor and that each of the voltage coefficients may also include a 3×3 tensor (e.g., in which i and j can each be x, y, or z). It will further be appreciated that these voltage coefficients, or the attenuation and phase shift of these voltage coefficients, may be considered to be the electromagnetic measurements or the "measured" voltages at each point or depth in a log. Likewise, the attenuation and phase shift of each of these voltage coefficients may be considered to be electromagnetic measurements.

Geosteering and reservoir mapping electromagnetic tools, for example as described above, may provide complex deep and/or ultradeep azimuthal resistivity (UDAR) measurements while drilling. Using interpretation software, these measurements can be used to profile subterranean formation structure and reservoir fluid distribution up to and exceeding distances of 100 feet (30 meters) away from a wellbore. The quality of this interpretation is highly dependent on the quality of the EM measurements. In practice, it is often necessary to distinguish measurements based on their noise level to avoid biasing or even deteriorating the interpreted results with unreliable data.

Since acquiring and processing UDAR measurements is a challenging task, measurement uncertainty has never been systematically investigated. In commercial operations, the standard approach has been for geosteering engineers to use their experience to manually remove channels expected to be less reliable. UDAR noise models may be consulted to simulate tool responses based on a given formation, however, knowledge about the true formation can only be obtained after the interpretation process.

In the disclosed embodiments, LWD resistivity measurements (such as UDAR measurements) are evaluated using a trained machine-learning algorithm to estimate measurement channel noise levels directly from the raw measurements; thus, avoiding the need for an initial interpretation. To this end, a large training data set may be created (e.g., computed) with raw measurements and noise levels from a wide range of simulated scenarios. A machine-learning algorithm, for example, a neural network, such as a feed forward neural network, or a decision forest, may be trained to predict these noise levels directly from the measurements without access to the actual scenario (e.g., without access to the formation model or structure). The trained model may then be used to evaluate the noise levels and uncertainties in unseen scenarios and real-world operations.

Figure 3:
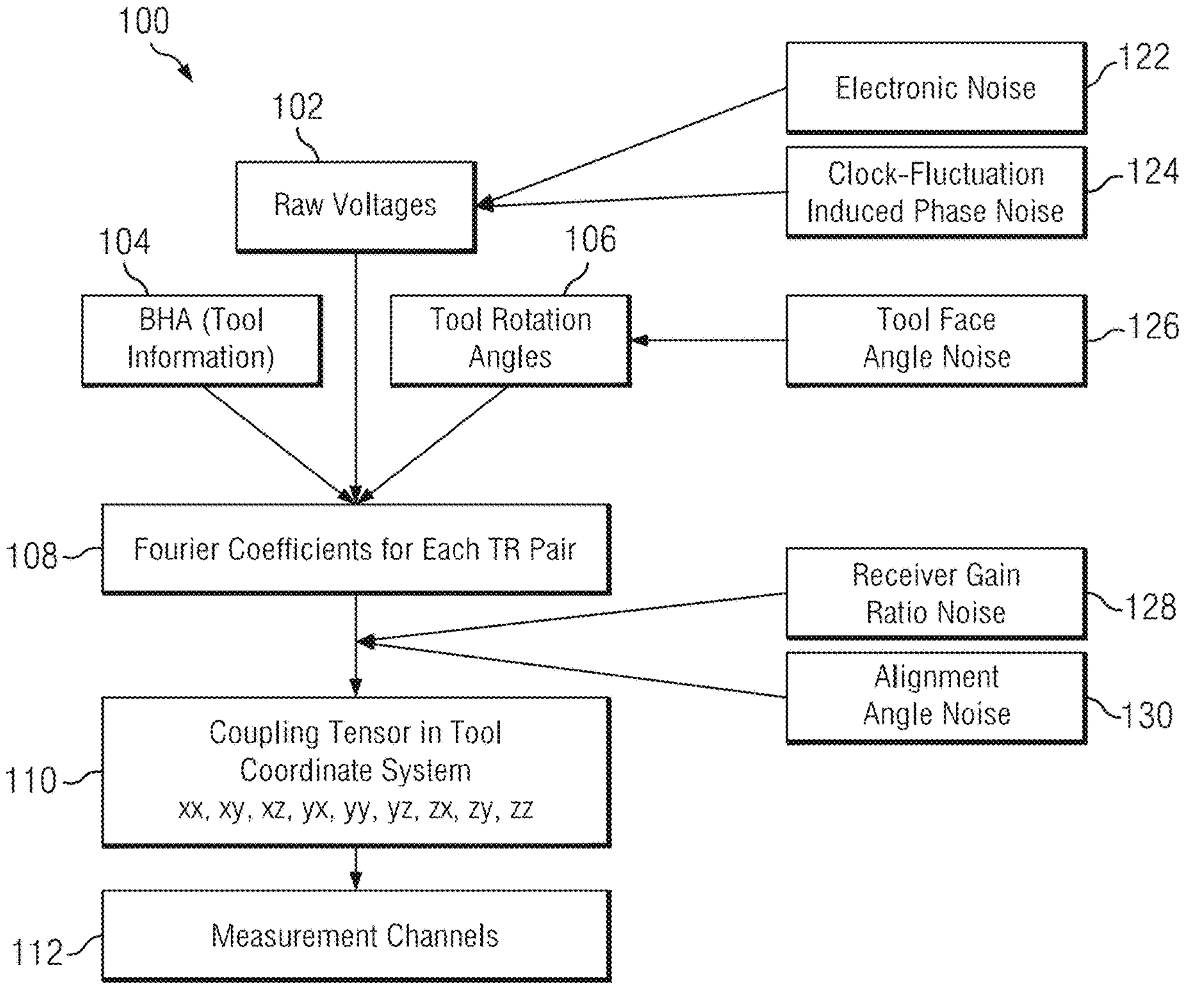
FIG. 3 depicts one example embodiment of a noise model in flow chart form with the EM measurement construction shown on the left and various noise sources shown on the right.

Turning now to FIG. 3, a flow chart of one example EM measurement generation workflow 100 is depicted. The measurement construction is shown on the left and various noise sources are shown on the right. An example EM measurement has been described above in general with respect to FIG. 2. Raw voltage measurements are made at 102. As described above, the receiver voltages are induced by a transmitter firing and depend on the subterranean formation properties, the orientation (dip) of the wellbore in the formation, the EM tool configuration 104 (e.g., the transmitter and receiver configurations and spacing), as well as the rotational orientation of the tool in the wellbore 106 (the toolface). Moreover, in practice, the measured receiver voltages are subject to electronic noise 122 and clock-fluctuation-induced phase noise 124 as depicted, which may depend on the wellbore conditions.

With continued reference to FIG. 3, the measured raw voltages are processed at 108 in combination with measured toolface angles 106 (which are also subject to measurement noise at 126) to compute the Fourier coefficients for each transmitter receiver pair (e.g., for each receiver at which the voltage measurements are made at 102). The computed Fourier coefficients may be transformed into a full or partial 3×3 coupling tensor to obtain, for example, xx, xy, xz, yx, yy, yz, zx, zy, and/or zz couplings (measurements) in the tool coordinate system at 110. These couplings may in turn be output as EM measurement channels at 112. This transformation may introduce additional noise sources such as receiver gain ratio noise 128 and alignment angle noise 130. The depicted noise/error sources may be characterized based on actual tool performance and added into the computation process with error/noise levels representing the actual error/noise levels in the measurement tool. The final computed measurements may therefore contain the same level of error/noise as the actual tool measurements.

Figure 4:
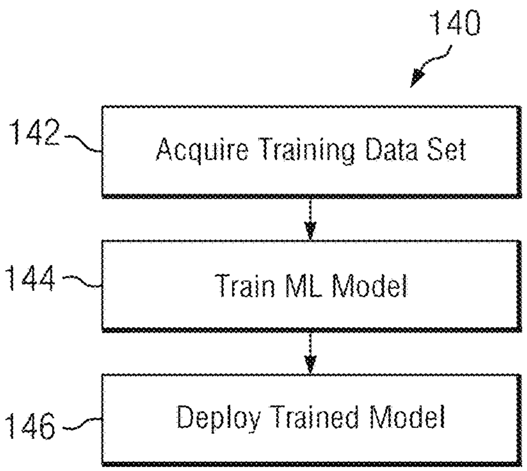
FIG. 4 depicts a flow chart of one example method for training a machine learning (ML) model to compute EM measurement uncertainty.

FIG. 4 depicts a flow chart of one example method 140 for training a ML model to compute EM measurement uncertainty. In use, the input to the trained ML model is a set (full or partial) of EM measurements (e.g., measurement channels such as the above described full or partial 3×3 coupling tensor at 110 and 112 of FIG. 3). Other EM measurements (or measurement channels) may include, for example, harmonic resistivity (UHR), harmonic anisotropy (UHA), symmetrized directional attenuation (USD), anti-symmetrized directional attenuation (UAD), etc. as well as other drilling parameters (such as BHA parameters and the EM tool construction, rate of penetration, etc.). In example embodiments, the EM logging measurements may include at least 12 measurement channels (e.g., at least 24, at least 36, at least 48, at least 60, at least 72, at least 84, or at least 96 measurement channels). The output of the trained ML model is the measurement uncertainty of each measurement channel, which may include systematic error (described by constant shift) and random noise (described by standard deviation).

A training data set is acquired at 142 and used to train the ML model at 144. The training data set (acquired as described in more detail below with respect to FIG. 5) may be split into a training subset and a validation subset and then used to train the ML model at 144. The training may include identifying relationships and/or correlations between an EM measurement log (a series of measurements made with time or depth) and the corresponding measurement uncertainty. The measurement uncertainty may include a standard deviation, a distribution of standard deviations, or a distribution of noise determined from the modelled measurements. The training and validation may further include tuning model hyper parameters and optimizing to achieve the lowest mean absolute percentage error (MAPE). The training may make use of customized deep learning architectures suitable for regression and may further compare and contrast the predictive performance of many different artificial intelligence (AI) based regression methods including, for example, linear regression, decision trees, gradient boosting, random forest, neural networks, recurrent neural networks, convolutional neural networks, feed forward neural networks, and transformer networks, as well as an ensemble of the best performing models to define which is the best performing architecture. The trained model may be deployed in the field (e.g., at the wellsite in an EM logging tool or on a surface) at 146.

Figure 5A:
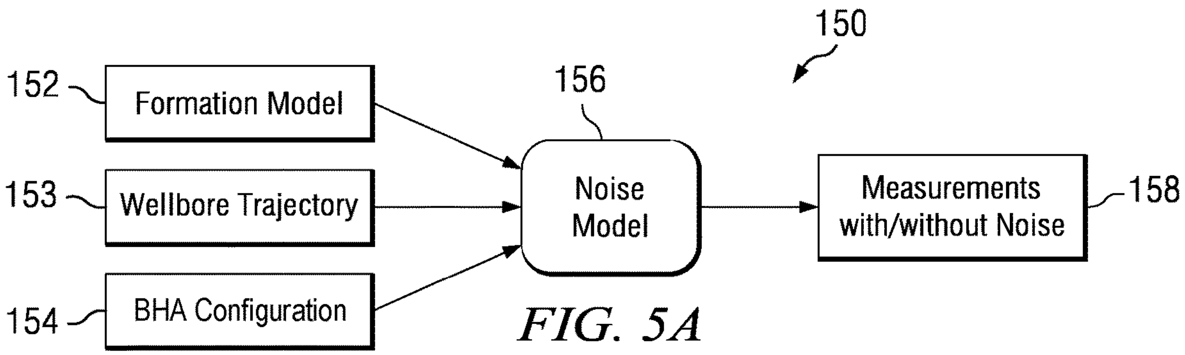
FIGS. 5A and 5B (collectively FIG. 5) depict example methods for generating a training data set.
Figure 5B:
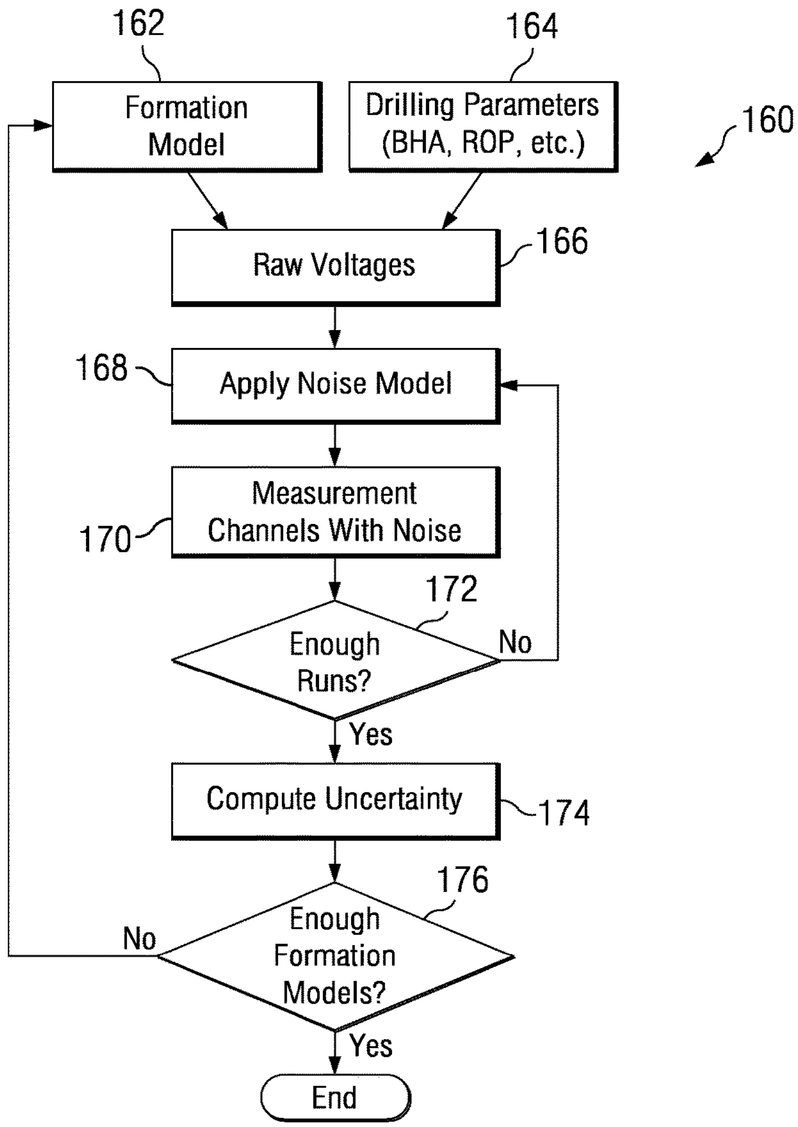

Turning now to FIGS. 5A and 5B (collectively FIG. 5), the training data set (e.g., training data set 142 in FIG. 4) may be acquired via modeling the EM logging tool response using a forward model including a noise model (e.g., including one or more of the noise sources described above in FIG. 3). In FIG. 5A, a method 150 for computing a training data set is depicted. A formation model 152, the wellbore (or tool) trajectory 153, and a BHA configuration 154 are input into a noise model 156, which is in turn used to compute synthetic EM measurements at 158, for example, with and without noise. The noise model is configured to compute the EM measurements, for example, based on a one-dimensional (1D) forward model including multiple parallel layers (strata). Each of the layers may be oriented at a constant dip angle with respect to the wellbore and may further include horizontal and vertical resistivity values. The synthetic EM measurements may be computed, for example, based on the measurement construction process described above with respect to FIG. 3.

FIG. 5B depicts one example method 160 for generating the training data set (e.g., at 142 of FIG. 4). In general, for a given formation model and drilling parameters, a forward model may be used to compute the raw voltages for each transmitter receiver pair at various toolface angles and depths within the model. The noise model may be applied to generate (compute) measurements with noise. A large number of simulated measurements may be computed for each of a large number of formation models and noise levels in a comprehensive data set. For example, hundreds or even thousands or tens of thousands of formation structures having various layer resistivity values and layer thicknesses may be employed. Moreover, hundreds or even a thousand or more noise responses/levels may also be evaluated such that a reliable standard deviation may be computed for each EM measurement channel.

With continued reference to FIG. 5B, the selected formation model and drilling parameters (e.g., including the EM tool construction such as the transmitter receiver spacings and the antenna configurations) are depicted at 162 and 164. As noted above, many hundreds or thousands of models may be evaluated. These are evaluated using the forward model to compute voltage measurements at the receiver for each transmitter-receiver pair at 166. The noise model is applied to the computed voltage measurements at 168 to obtain raw voltage measurements including noise. These noisy raw voltage measurements may then be transformed into the desired measurement channels (e.g., measurement logs including noise) at 170, for example, as described above. After repeating 168 and 170 a sufficient number of times 172, a measurement uncertainty (e.g., a standard deviation or a distribution of noise obtained from the noisy measurements) is computed at 174. This process is repeated at 176 a large number of times until sufficiently large data set is acquired. While the disclosed embodiments are not so limited, by sufficiently large it is meant that many hundreds or even thousands of relevant formation models representative of a desired range of drilling parameters has been evaluated. Example parameters that may be varied in a 1D formation model may include the number of formation layers, the thickness of each of the formation layers, the dip angle of the wellbore with respect to the layers, horizontal and vertical resistivity values of each layer (or equivalently a horizontal resistivity value and a corresponding anisotropy of each layer), a tool inclination, and an edge margin.

As described above, the ML training process is intended to find correlations between EM measurement data (measurement logs) and uncertainties in the measurements such that the trained ML model can output uncertainties for any given set of measurement logs, without foreknowledge of a particular formation model and/or the intermediate raw voltages. The drilling parameters selected in FIG. 5 may be a given parameter set, so that the trained ML only works for this set of drilling parameters. Alternatively, the drilling parameters may be varied within a predetermined range so that the ML model can work for a reasonable/desirable range of operating parameters.

With continued reference to FIG. 5, for each of the formation structures evaluated, noise free measurements may be computed and represent the true measurements. As noted above many noisy measurements are also generated (e.g., hundreds or more) and may be used to further compute a standard deviation or a noise distribution for each measurement channel. The training data may therefore include, the formation structures, one or more noisy measurements for each formation structure, and a standard deviation or noise distribution (e.g., a noise level) for each formation structure.

With reference again to FIG. 4, and continued reference to FIG. 5, the computed training data set may be used to train the ML model. It will be appreciated that there are many known ways to formulate ML problems. In example embodiments, the model training is formulated as a regression problem in which the input features/labels include the noisy measurements (e.g., the noisy measurement channels generated for each of the formation structures) and the output (i.e., the model prediction) may be the standard deviation of the noisy EM measurements or a distribution of the standard deviation. The disclosed embodiments may make use of substantially any suitable regression model, for example including a linear regression model, a decision tree, such as a random forest or gradient boosting model, and/or a neural network (NN), such as a feed forward neural network, and the like.

In linear regression models, the model assumes that the relationship between the input and the output is linear. The relationship may be modeled through a disturbance term (or error), which is an unobserved random variable that adds noise to the linear relationship. In such embodiments, the error or errors may be assumed, for example, to be Gaussian and an ordinary least-squares approach may be used to estimate the parameters of the model (e.g., the optimum parameter may be defined such that it minimizes the sum of the mean squared loss).

In decision tree models, a training model is configured to predict the classes or value of a target variable by learning simple decision rules inferred from the training data. For example, to predict a label for an input, the model starts at the root of the tree and compares a value or values of the root attribute with the input attribute. The model then selects a corresponding branch and follows the same process along a path of subsequent branches. A suitable training process may include defining an original set as a root node, iterating through every unused attribute of the set and calculating an entropy and information gain of this attribute, selecting the attribute that has the smallest entropy or largest information gain, splitting the set by the selected attribute to produce a subset, and continuing to recur on each subset, considering only attributes not previously selected.

The disclosed embodiments may make use of various decision tree models, for example, including ensemble models that combine several base models to produce an optimal or best prediction, random forest regression models that construct multiple decision trees during training and output an average or weighted average prediction, or a gradient boosting model. A suitable gradient boosting model may include three primary components: a loss function, weak learners, and an additive model. The loss function may estimate the quality of the model predictions. The weak learner is a model that classifies the data poorly. An additive model is a sequential approach of adding multiple decision trees such that the model is closer to its final version with each iteration.

The disclosed embodiments may advantageously make use of a feed forward neural network. A NN is a collection of mathematical models (referred to as neurons or nodes) that are configured to approximate nonlinear functions. The neurons may be arranged in a sequence of layers including a first layer (the input layer), one or more intermediate layers or hidden layers, and a final layer (the output layer). The input into each neuron is generally a number obtained by a linear combination of the outputs of connected neurons in the previous layer. Each neuron computes a corresponding output from the inputs according to its model or equation. The performance of the neurons depends upon the strength (or weights) of the connections between the neurons. When a NN is being trained, all parameters may start with random values. During training, the weights and thresholds may be adjusted at each iteration until the model converges. The training may include use of a loss function such as a mean squared error (MSE) function as well as an Adam Optimizer. Moreover, the NN may be trained using known libraries in Python, scikit-learn and/or PyTorch.

In particularly advantageous embodiments, the feed-forward NN includes one or more (e.g., a plurality of) dense hidden layers. By dense it is meant that each neuron in a layer is connected to all of the neurons from the previous layer and to all of the neurons in the subsequent layer. In one example embodiment, the NN includes at least three dense hidden layers (e.g., at least four, or at least five). In advantageous embodiments, each of the dense layers may have twice as many neurons as the number of EM measurement channels. For example, the EM logging measurements may include at least 12 measurement channels (e.g., 24, 36, 48, 60, 72, 84, or 96). In such embodiments, the dense hidden layer may include 24 neurons (e.g., 48, 72, 96, 120, 144, 168, or 192). In addition to the assigned weight, each neuron in the hidden layers includes an activation function that filters the signal to provide a final output value. In example embodiments, the activation function may include a ReLU piecewise linear function that outputs the input when the input is positive and outputs zero when the input is negative. Model training may further include a hyper-parameter optimization step, for example, employing a grid search.

Upon completion of the model training, the trained model may be validated or tested using a validation data set that also includes modeled EM measurements and a corresponding uncertainty. In example embodiments, the trained model performance may be determined by the relative error of the estimated standard deviation with respect to the true standard deviation computed using the noise model. As also noted below, it may be desirable for the trained ML model to have a relative error of less than 10% for at least 90% of the data obtained in each measurement channel.

Figure 6A:
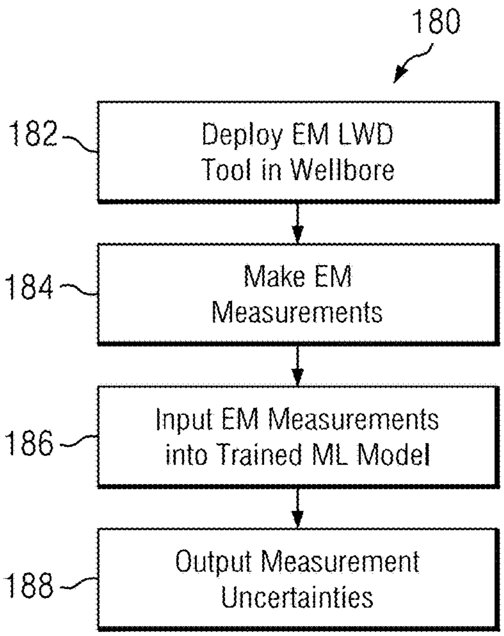
FIGS. 6A and 6B (collectively FIG. 6) depict methods for using a trained ML model to estimate EM measurement uncertainty.
Figure 6B:
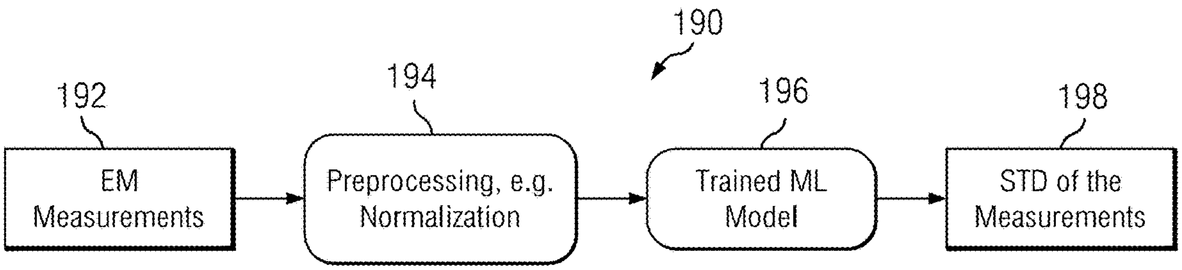

Turning now to FIGS. 6A and 6B (collectively FIG. 6), methods 180 and 190 for using a trained ML model to estimate an uncertainty of an EM measurement log are depicted. In FIG. 6A, an EM LWD measurement tool may be deployed in a subterranean wellbore at 182. The EM measurement tool may be employed to make EM measurements, for example, while drilling at 184 to obtain an EM measurement log including multiple EM measurement channels as described above. The EM measurement log may be input into the trained ML model at 186, which may in turn output measurement uncertainties for the log at 188. It will be appreciated that the trained ML model may be deployed in the EM logging tool and may be configured to be utilized by downhole processor (such as in controller 59 in EM logging tool 50 shown on FIG. 2). In such embodiments, the measurements may be made and evaluated downhole to determine the corresponding measurement uncertainties. The measured uncertainties may then further be transmitted to the surface or saved in downhole memory (along with the measurements). In other embodiments, the trained ML model may be deployed at the surface, for example, in a computer at the rig site. The EM measurement log may be transmitted from the EM measurement tool in the wellbore to the surface while drilling (e.g., using conventional telemetry techniques). The EM measurement log may then be assembled at the surface and input into the ML model to obtain the measurement uncertainties.

In FIG. 6B EM logging measurements are made at 192. The measurements may be preprocessed, for example, normalized at 194 and then evaluated with the trained ML model at 196 to obtain a standard deviation of each measurements 198. It will be appreciated that in such embodiments, the estimated standard deviation obtained at 198 is indicative of the measurement uncertainty with the uncertainty increasing with increasing standard deviation and decreasing with decreasing standard deviation.

In a proof of concept evaluation, the disclosed methods were applied to the noise model of a UDAR EM logging tool having 96 measurement channels, including 8 types of measurements at 6 distinct measurement frequencies and 2 receivers. The scenarios were generated using a formation distribution designed to cover most cases that would be encountered in true to life EM LWD operation, with noise levels being computed as the standard deviation of output for each channel. The training dataset had 100,000 samples and the test set had 10,000 samples. The standard deviation for each sample was computed from a set of 1000 simulated noise levels/configurations. The final model performance was computed using the relative error, with an error goal of less than 10% for at least 90% of all the data in the test set.

Feed forward neural networks were found to provide the best results, particularly when predicting each of the channels in parallel. It was found that attempting to predict noise in one channel may help bootstrap the feature search for other channels as well. With 4 hidden layers, this preliminary evaluation was able to reach the 10% target for 42 of the 96 channels, in particular, for the low-frequency channels. The worst performing channel achieved a relative error of 20.6% for the best 90% of its data. Classifying networks that focused on one channel at a time were found to improve this result. As an additional test, the trained network was used to provide predictions on simulations of actual scenarios and benchmark problems, in which the method performed very well. Moreover, it was also found that utilizing a distribution of noise in the model training further improved the performance of the trained model.

Figure 7:
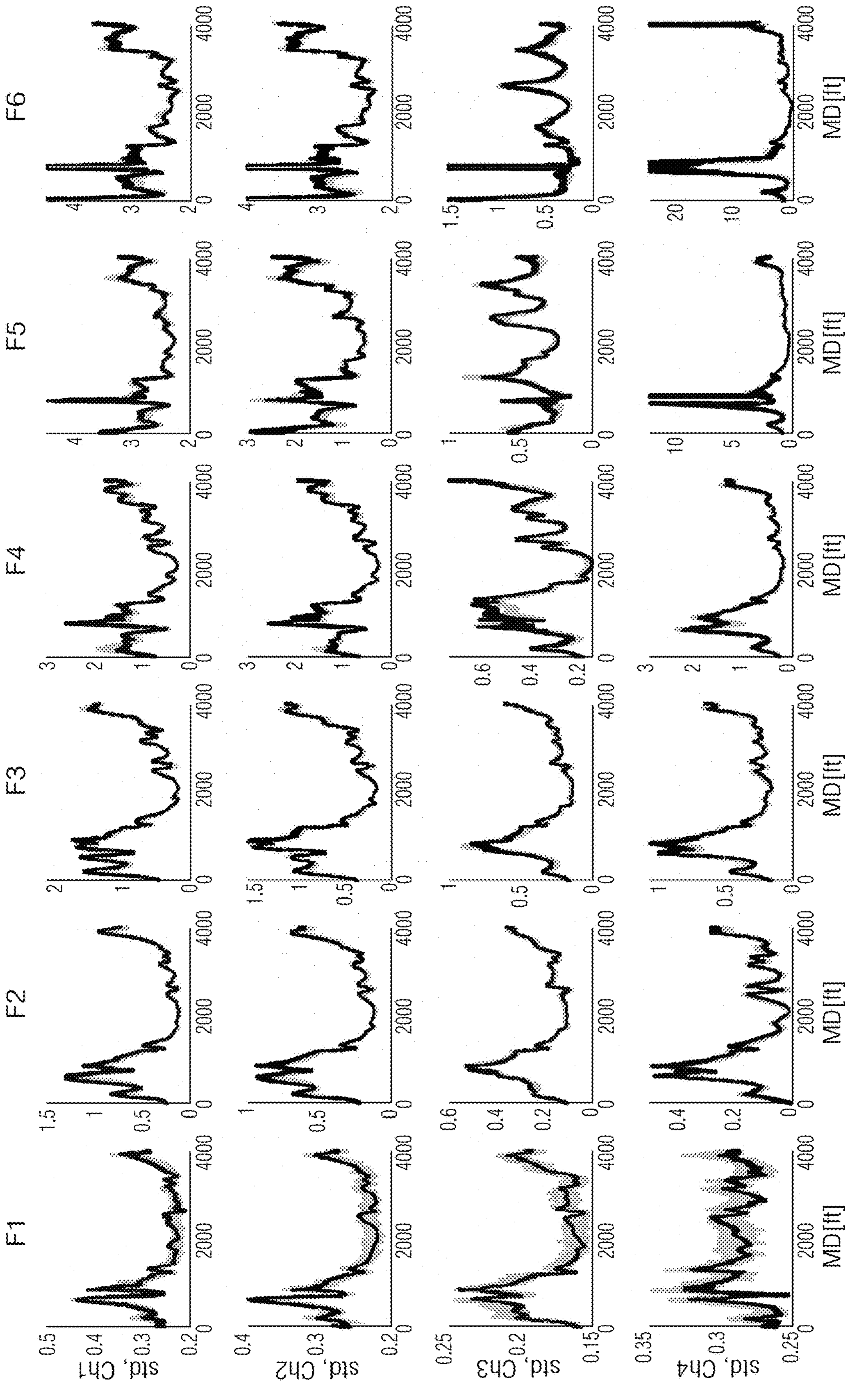
FIG. 7 depicts plots of uncertainty as a function of measured depth for a proof of concept evaluation.

FIG. 7 depicts plots of uncertainty (standard deviation) as a function of measured depth for four measurement channels (Ch1-Ch4) across six frequencies (F1-F6). As shown, the predicted uncertainty (black) matched well with the uncertainty computed directly from the noise model (grey) in this example using a feed forward NN.

It will be understood that the present disclosure includes numerous embodiments. These embodiments include, but are not limited to, the following embodiments.

In a first embodiment a method for estimating a measurement uncertainty of electromagnetic (EM) logging measurements made in a wellbore comprises deploying an EM logging tool in a wellbore; using the EM logging tool to make EM logging measurements in the wellbore; and evaluating the EM logging measurements with a trained machine learning model to estimate the measurement uncertainties of the EM logging measurements, wherein the trained machine learning model is trained using a training data set made up of modeled EM logging measurements and corresponding measurement uncertainties.

A second embodiment may include the first embodiment, wherein the EM logging measurements comprise at least one of a full or partial 3×3 coupling tensor including xx, xy, xz, yz, yy, yz, zx, zy, and/or zz EM couplings, harmonic resistivity, harmonic anisotropy, symmetrized directional attenuation, and anti-symmetrized directional attenuation that are derived from raw voltage measurements.

A third embodiment may include any one of the first through second embodiments, wherein the EM logging measurements comprise a plurality of deep reading EM measurement channels made at a plurality of distinct frequencies.

A fourth embodiments may include any one of the first through third embodiments, wherein the evaluating the EM logging measurements with the trained machine learning model is performed downhole using a processor deployed in the EM logging tool.

A fifth embodiment may include any one of the first through fourth embodiments, wherein the estimated measurement uncertainties comprise standard deviations of the EM logging measurements.

A sixth embodiment may include any one of the first through fifth embodiments, further comprising computing the training data set using a forward model and a corresponding noise model based on a plurality of one-dimensional formation models and a plurality of noise measurement levels; and training a machine learning model with the computed training data set to obtain the trained machine learning model.

A seventh embodiment may include any one of the first through sixth embodiments, wherein the trained machine learning model comprises a trained feed forward neural network.

An eighth embodiment may include the seventh embodiment, wherein the trained feed forward neural network comprises an input layer, a plurality of dense hidden layers, and an output layer.

A ninth embodiment may include the eighth embodiment, wherein the EM logging measurements comprise at least 12 measurement channels; the input layer and output layer each comprise a single neuron for each of the at least 12 measurement channels; and each of the plurality of dense hidden layers comprises two neurons for each of the at least 12 measurement channels.

A tenth embodiment may include the ninth embodiment, wherein the trained feed forward neural network has a relative error of less than 10% for at least 90% of the measurement channels.

In an eleventh embodiment, a downhole electromagnetic (EM) logging tool comprises an EM transmitter configured to transmit EM energy into a wellbore; an EM receiver configured to be electromagnetically coupled with the EM transmitter and to receive voltage signals corresponding to the transmitted EM energy; and a processor configured to (i) cause the EM transmitter to transmit the EM energy into the wellbore, (ii) cause the EM receiver to receive the voltage signals, (iii) process the received voltage signals to construct EM measurements; and (iv) evaluate the EM measurements with a trained machine learning model to estimate measurement uncertainties of the EM measurements.

A twelfth embodiment may include the eleventh embodiment, wherein the EM measurements comprise at least one of a full or partial 3×3 coupling tensor including xx, xy, xz, yz, yy, yz, zx, zy, and/or zz EM couplings, harmonic resistivity, harmonic anisotropy, symmetrized directional attenuation, and anti-symmetrized directional attenuation that are derived from the received voltage signals.

A thirteenth embodiment may include any one of the eleventh through twelfth embodiments, wherein the estimated measurement uncertainties comprise standard deviations of the EM measurements.

A fourteenth embodiment may include any one of the eleventh through thirteenth embodiments, wherein the trained machine learning model comprises a trained feed forward neural network.

A fifteenth embodiment may include the fourteenth embodiment, wherein the EM measurements comprise at least 12 measurement channels; the trained feed forward neural network comprises an input layer, a plurality of dense hidden layers, and an output layer; the input layer and output layer each comprise a single neuron for each of the at least 12 measurement channels; and each of the plurality of dense hidden layers comprises two neurons for each of the at least 12 measurement channels.

In a sixteenth embodiment, a method for training a machine learning model comprises selecting a formation model and a configuration of an electromagnetic (EM) logging tool; computing synthetic EM voltages using a forward model, the selected formation model, and the selected configuration of the EM logging tool; applying noise to the synthetic EM voltages a plurality of times to obtain a set of noisy synthetic EM measurements; computing a standard deviation from the set of noisy synthetic EM measurements; repeating the selecting, the computing synthetic EM voltages, the applying, and the computing the standard deviation for a plurality of formation models to obtain a training data set including a set of modeled EM measurements and corresponding standard deviations; and training a machine learning model with the training data set to obtain a trained machine learning model.

A seventeenth embodiment may include the sixteenth embodiment, wherein the machine learning model comprises a feed forward neural network.

An eighteenth embodiment may include the seventeenth embodiment, wherein the feed forward neural network comprises an input layer, a plurality of dense hidden layers, and an output layer.

A nineteenth embodiment may include any one of the sixteenth through eighteenth embodiments, wherein the applied noise comprises at least one of electronic noise, clock-fluctuation induced phase noise, toolface angle noise, receiver gain ratio noise, and alignment angle noise.

A twentieth embodiment may include any one of the sixteenth through nineteenth embodiments, wherein the computing a standard deviation further comprises computing a distribution of noise from the set of noisy synthetic EM measurements.

Although estimating EM LWD measurement uncertainty using machine learning has been described in detail, it should be understood that various changes, substitutions and alterations can be made herein without departing from the spirit and scope of the disclosure as defined by the appended claims.

The invention claimed is:

1. A method for training a machine learning model, the method comprising:

- selecting a formation model and a configuration of an electromagnetic (EM) logging tool;
- computing synthetic EM voltages using a forward model, the selected formation model, and the selected configuration of the EM logging tool;
- applying noise to the synthetic EM voltages a plurality of times to obtain a set of noisy synthetic EM measurements;
- computing a standard deviation from the set of noisy synthetic EM measurements;
- repeating the selecting, the computing synthetic EM voltages, the applying, and the computing the standard deviation for a plurality of formation models to obtain a training data set including a set of modeled EM measurements and corresponding standard deviations;
- training a machine learning model with the training data set to obtain a trained machine learning model;
- collecting, with the EM logging tool deployed downhole in a wellbore, field EM measurements; and
- evaluating, downhole at the EM logging tool, the field EM measurements with the trained machine learning model deployed at the EM logging tool to estimate measurement uncertainties of the field EM measurements.

2. The method of claim 1, wherein the machine learning model comprises a feed forward neural network.

3. The method of claim 2, wherein the feed forward neural network comprises an input layer, a plurality of dense hidden layers, and an output layer.

4. The method of claim 3, wherein the synthetic EM measurements include at least 12 measurement channels, the input layer and output layer each include a single neuron for each of the at least 12 measurement channels, and each of the plurality of dense hidden layers includes two neurons for each of the at least 12 measurement channels.

5. The method of claim 1, wherein the applied noise comprises at least one of electronic noise, clock-fluctuation induced phase noise, toolface angle noise, receiver gain ratio noise, and alignment angle noise.

6. The method of claim 1, wherein the computing a standard deviation further comprises computing a distribution of noise from the set of noisy synthetic EM measurements.

7. The method of claim 1, further comprising transmitting the measurement uncertainties to a surface location.

8. A system, comprising:

- a processor and memory, the memory including instructions that cause the processor to:
  - select a formation model and a configuration of an electromagnetic (EM) logging tool;
  - compute synthetic EM voltages using a forward model, the selected formation model, and the selected configuration of the EM logging tool;
  - apply noise to the synthetic EM voltages a plurality of times to obtain a set of noisy synthetic EM measurements;
  - compute a standard deviation from the set of noisy synthetic EM measurements;
  - repeat the selecting, the computing synthetic EM voltages, the applying, and the computing the standard deviation for a plurality of formation models to obtain a training data set including a set of modeled EM measurements and corresponding standard deviations;
  - train a machine learning model with the training data set to obtain a trained machine learning model;
  - collect, with the EM logging tool deployed downhole in a wellbore, field EM measurements;
  - evaluate, downhole at the EM logging tool, the field EM measurements with the trained machine learning model deployed at the EM logging tool to estimate measurement uncertainties of the field EM measurements; and
  - transmit the measurement uncertainties to a surface location.

9. A non-transitory computer readable medium including instructions that when executed by a processor, cause the processor to:

- select a formation model and a configuration of an electromagnetic (EM) logging tool;
- compute synthetic EM voltages using a forward model, the selected formation model, and the selected configuration of the EM logging tool;
- apply noise to the synthetic EM voltages a plurality of times to obtain a set of noisy synthetic EM measurements;
- compute a standard deviation from the set of noisy synthetic EM measurements;
- repeat the selecting, the computing synthetic EM voltages, the applying, and the computing the standard deviation for a plurality of formation models to obtain a training data set including a set of modeled EM measurements and corresponding standard deviations;
- train a machine learning model with the training data set to obtain a trained machine learning model, wherein the machine learning model includes a feed forward neural network having an input layer, a plurality of dense hidden layers, and an output layer, and wherein the synthetic EM measurements include at least 12 measurement channels, the input layer and output layer each include a single neuron for each of the at least 12 measurement channels, and each of the plurality of dense hidden layers includes two neurons for each of the at least 12 measurement channels;

collect, with the EM logging tool deployed downhole in a wellbore, field EM measurements; and evaluate, downhole at the EM logging tool, the field EM measurements with the trained machine learning model deployed at the EM logging tool to estimate measurement uncertainties of the field EM measurements.

* * * * *